US012679394B2

(12) United States Patent
Lee et al.

(10) Patent No.: US 12,679,394 B2
(45) Date of Patent: Jul. 14, 2026

(54) METHOD AND APPARATUS FOR CHANGING ROUTE WHEN ERROR OCCURS IN AUTONOMOUS DRIVING ARTIFICIAL INTELLIGENCE

(71) Applicant: ELECTRONICS AND TELECOMMUNICATIONS RESEARCH INSTITUTE, Daejeon (KR)

(72) Inventors: Jeong-Woo Lee, Daejeon (KR); Kyoung-Wook Min, Daejeon (KR); Kyung Bok Sung, Daejeon (KR); Dong-Jin Lee, Daejeon (KR); Jeong Dan Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 361 days.

(21) Appl. No.: 18/454,964

(22) Filed: Aug. 24, 2023

(65) Prior Publication Data

US 2024/0124002 A1 Apr. 18, 2024

(30) Foreign Application Priority Data

Oct. 13, 2022 (KR) ........................ 10-2022-0131107
Jun. 21, 2023 (KR) ........................ 10-2023-0079600

(51) Int. Cl.
*B60W 50/038* (2012.01)
*B60W 50/02* (2012.01)
*B60W 60/00* (2020.01)
*G08G 1/16* (2006.01)

(52) U.S. Cl.
CPC ...... *B60W 50/038* (2013.01); *B60W 50/0205* (2013.01); *B60W 60/0015* (2020.02); *G08G 1/16* (2013.01)

(58) Field of Classification Search
CPC ........... B60W 50/038; B60W 50/0205; B60W 60/0015; B60W 2556/45; B60W 50/029; B60W 60/00186; G08G 1/16; G08G 1/166; G01C 21/3453
See application file for complete search history.

(56) References Cited

U.S. PATENT DOCUMENTS 8,738,197 B2    5/2014 An et al.
11,667,281 B2*  6/2023 Kumano ............... B60W 30/09
                                                      701/26
2015/0187216 A1  7/2015 Kwak
2017/0278321 A1*  9/2017 Nishida ................ G07C 5/0808
(Continued)

FOREIGN PATENT DOCUMENTS

KR         10-2243244 B1    4/2021
WO         2020044251 A1    3/2020

*Primary Examiner* — Christopher George Fees
(74) *Attorney, Agent, or Firm* — Rabin & Berdo, P.C.

(57) ABSTRACT

A method for changing a route when an error occurs in an autonomous driving AI includes collecting error information of the AI when an error of the AI has occurred, extracting, from a storage, past error information about a same kind of AI as that of the AI based on the error information of the AI, generating an error analysis result based on the past error information, generating an error analysis result message based on the error analysis result, and determining whether the driving of the autonomous driving vehicle needs to be stopped based on the error analysis result message.

13 Claims, 4 Drawing Sheets

(56)        References Cited

U.S. PATENT DOCUMENTS

| | | | |
|---|---|---|---|
| 2017/0351261 A1* | 12/2017 | Levinson | G01S 7/497 |
| 2020/0070821 A1* | 3/2020 | Wang | B60W 50/0097 |
| 2020/0098394 A1* | 3/2020 | Levinson | G01S 7/497 |
| 2021/0163021 A1* | 6/2021 | Frazzoli | B60W 50/023 |
| 2021/0201464 A1* | 7/2021 | Tariq | G06V 20/56 |
| 2021/0316742 A1 | 10/2021 | Hayes et al. | |
| 2021/0387631 A1* | 12/2021 | Gong | B60W 10/18 |
| 2022/0012588 A1* | 1/2022 | Rhee | G06N 3/04 |
| 2022/0032957 A1* | 2/2022 | Wulfe | G01C 21/3407 |
| 2022/0083412 A1 | 3/2022 | Hsiong et al. | |
| 2022/0126869 A1 | 4/2022 | Wang et al. | |
| 2022/0164609 A1* | 5/2022 | Lee | G06F 18/25 |
| 2024/0351592 A1* | 10/2024 | Sadeghi | B60W 50/00 |
| 2025/0002045 A1* | 1/2025 | Yoshida | B60W 60/0015 |

* cited by examiner

METHOD AND APPARATUS FOR CHANGING ROUTE WHEN ERROR OCCURS IN AUTONOMOUS DRIVING ARTIFICIAL INTELLIGENCE

CROSS-REFERENCE TO RELATED APPLICATION

This application claims priority to and the benefit of Korean Patent Application No. 10-2022-0131107, filed on Oct. 13, 2022, and Korean Patent Application No. 10-2023-0079600, filed on Jun. 21, 2023, the disclosures of which are incorporated herein by reference in their entirety.

BACKGROUND

1. Technical Field

The present disclosure relates to a method and apparatus which, when an error occurs in an autonomous driving artificial intelligence, enable autonomous driving along a changed route that enables minimization of an error occurrence and an accident risk until that error is corrected.

2. Related Art

As for an artificial intelligence used in an autonomous driving vehicle, when it encounters a situation with regard to which it has not been trained before, there is a possibility that it cannot recognize an object which it needs to recognize or that it recognizes, as a different object, an object which it needs to recognize. Therefore, the artificial intelligence of an autonomous driving vehicle needs to be trained with regard to a range of situations. However, the artificial intelligence cannot be trained in advance with regard to all situations that may come to pass during the driving, and if it does not perform the recognition properly, it needs to be updated through retraining with regard to that situation. However, it cannot be trained in a short time because the update of artificial intelligence requires processes of collecting data relating to the situation and being retrained based on the collected data. Therefore, in the case of a serious error situation, it is necessary to stop the driving of the vehicle, and if not, it is necessary to perform the autonomous driving while avoiding that situation.

DOCUMENT OF RELATED ART

Patent Document

Patent Document 1: Korean Patent No. 10-2243244

SUMMARY

The present disclosure is to provide a method and apparatus for changing a route which, when an error occurs in autonomous driving artificial intelligence, can generate error avoidance information and behavior restriction information in view of an accident risk analysis result in order to minimize the error occurrence until the error is corrected so that autonomous driving can be performed without an accident risk.

The objects of the present disclosure are not limited to the aforementioned ones, and unmentioned other objects will become apparent to those skilled in the art from the following description.

A method for changing a route when an error occurs in an autonomous driving artificial intelligence according to the present disclosure includes determining whether an error has occurred in an autonomous driving artificial intelligence; collecting error information of the artificial intelligence when the error of the artificial intelligence has occurred; extracting, from a storage, past error information about a same kind of artificial intelligence as that of the artificial intelligence based on the error information of the artificial intelligence; generating an error analysis result based on the past error information; generating an error analysis result message based on the error analysis result; and determining whether the driving of the autonomous driving vehicle needs to be stopped based on the error analysis result message.

In an embodiment of the present disclosure, the extracting of the past error information from the storage may include extracting, from the storage, past error information about a same kind and version of artificial intelligence as those of the artificial intelligence.

In an embodiment of the present disclosure, the error analysis result may include an accident risk. In this case, the generating of the error analysis result message may include including an autonomous driving operation availability information indicating 'operation interruption' into the error analysis result message when the accident risk is greater than or equal to a predetermined threshold value.

In an embodiment of the present disclosure, the determining of whether the driving of the autonomous driving vehicle needs to be stopped may include determining that the driving of the autonomous driving vehicle needs to be stopped when the error analysis result message includes the autonomous driving operation availability information indicating 'operation interruption'.

In an embodiment of the present disclosure, the error analysis result message may include an accident risk. In this case, the determining of whether the driving of the autonomous driving vehicle needs to be stopped may include determining that the driving of the autonomous driving vehicle needs to be stopped when the accident risk is greater than or equal to a predetermined threshold value.

In an embodiment of the present disclosure, the error analysis result may include an accident risk and an error avoidance information. In this case, the generating of the error analysis result message may include including an autonomous driving operation availability information indicating 'operation continuation' and the error avoidance information into the error analysis result message when the accident risk is less than a predetermined threshold value.

In an embodiment of the present disclosure, the determining of whether the driving of the autonomous driving vehicle needs to be stopped may include determining that it is not necessary to stop the driving of the autonomous driving vehicle when the error analysis result message includes the autonomous driving operation availability information indicating 'operation continuation'.

In an embodiment of the present disclosure, the method for changing a route when an error occurs in an autonomous driving artificial intelligence may further include resetting a driving route of the autonomous driving vehicle when it is determined that it is not necessary to stop the driving of the autonomous driving vehicle.

In an embodiment of the present disclosure, the method for changing a route when an error occurs in an autonomous driving artificial intelligence may further include resetting a driving route of the autonomous driving vehicle based on the error avoidance information when it is determined that it is not necessary to stop the driving of the autonomous driving vehicle.

In an embodiment of the present disclosure, the method for changing a route when an error occurs in an autonomous driving artificial intelligence may further include moving the autonomous driving vehicle to a safe place and stopping the driving of the autonomous driving vehicle when it is determined that the driving of the autonomous driving vehicle needs to be stopped.

In a method for changing a route in an autonomous driving system installed on an autonomous driving vehicle, a method for changing a route in an autonomous driving system when an error occurs in an autonomous driving artificial intelligence according to an embodiment of the present disclosure includes determining whether an error has occurred in an autonomous driving artificial intelligence; collecting error information of the artificial intelligence when the error of the artificial intelligence has occurred; transmitting the error information of the artificial intelligence to a cloud server; receiving an error analysis result message corresponding to the error information of the artificial intelligence from the cloud server; and determining whether the driving of the autonomous driving vehicle needs to be stopped based on the error analysis result message.

In an embodiment of the present disclosure, the method for changing a route in an autonomous driving system may further include moving the autonomous driving vehicle to a safe place and stopping the driving of the autonomous driving vehicle when the driving of the autonomous driving vehicle needs to be stopped.

In an embodiment of the present disclosure, the method for changing a route in an autonomous driving system may further include resetting a driving route of the autonomous driving vehicle when it is not necessary to stop the driving of the autonomous driving vehicle.

In an embodiment of the present disclosure, the determining of whether the driving of the autonomous driving vehicle needs to be stopped may include determining that the driving of the autonomous driving vehicle needs to be stopped when an accident risk included in the error analysis result message is greater than or equal to a predetermined threshold value.

In an embodiment of the present disclosure, the determining of whether the driving of the autonomous driving vehicle needs to be stopped may include determining that the driving of the autonomous driving vehicle needs to be stopped when the error analysis result message includes the autonomous driving operation availability information indicating 'operation interruption'.

In an embodiment of the present disclosure, the resetting of the driving route of the autonomous driving vehicle may include resetting the driving route of the autonomous driving vehicle based on error avoidance information included in the error analysis result message.

An autonomous driving system according to an embodiment of the present disclosure includes a recognition module configured to detect an object based on sensor data, determine a kind of the object using an artificial intelligence with respect to the detected object, and generate object information; an error detection module configured to determine whether an error has occurred in the artificial intelligence based on the object information; an error information collection module configured to collect error information of the artificial intelligence when the error of the artificial intelligence has occurred; a transmission and reception module configured to transmit the error information to a cloud server, and receive an error analysis result message corresponding to the error information from the cloud server; and an error response module configured to respond to the error of the artificial intelligence based on the error analysis result message.

In an embodiment of the present disclosure, the error response module may check whether the error analysis result message includes autonomous driving operation availability information indicating 'operation interruption,' and determine that it is necessary to stop the driving of the vehicle when the autonomous driving operation availability information indicating 'operation interruption' is included in the error analysis result message.

In an embodiment of the present disclosure, the error response module may determine that it is necessary to stop the driving of the vehicle when the error analysis result message includes an accident risk and the accident risk is greater than or equal to a threshold value.

In an embodiment of the present disclosure, the autonomous driving system may further include a determination module configured to set a driving route of the autonomous driving vehicle.

In an embodiment of the present disclosure, the error response module may deliver error avoidance information included in the error analysis result message to the determination module when an accident risk is included in the error analysis result message and the accident risk is less than a threshold value. In this case, the determination module resets a driving route of the autonomous driving vehicle based on the error avoidance information.

Through the present disclosure, the following advantageous effect can be obtained: when an error occurs in an autonomous driving artificial intelligence, a determination is made as to whether or not it is possible to drive, and when it is determined that it is possible to drive, the autonomous driving is allowed and made possible along a route with a low probability of occurrence of that error, thereby minimizing the error occurrence until the artificial intelligence error is corrected.

Advantageous effects which can be obtained from the present disclosure are not limited to the aforementioned ones, and other advantageous effects not mentioned above can be understood from the following detailed description by a person having ordinary skill in the art to which the disclosure belongs.

DETAILED DESCRIPTION

Figure 1:
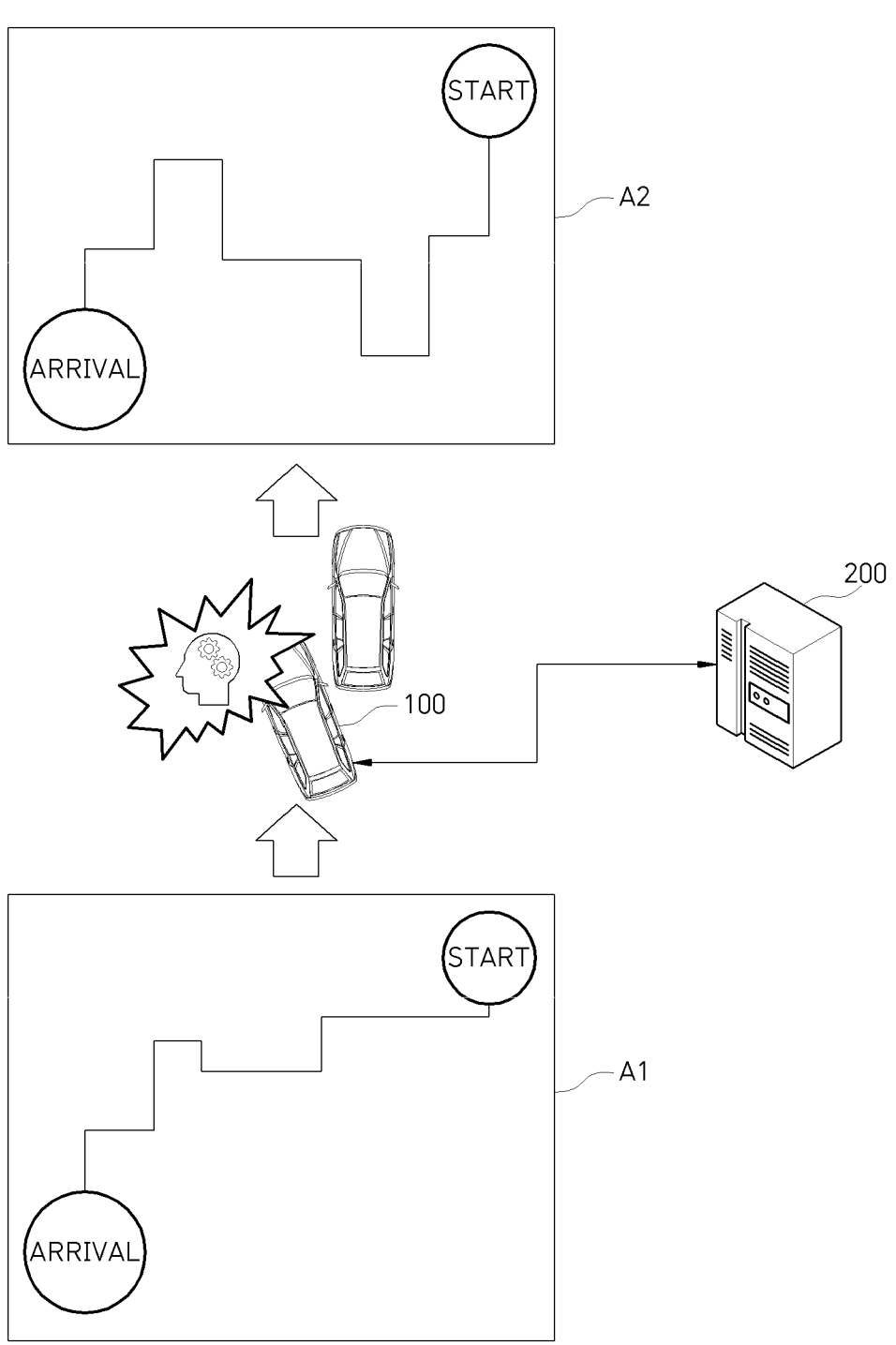
FIG. 1 shows a conceptual diagram of a method for changing a route when an error occurs in an autonomous driving artificial intelligence according to the present disclosure.

Advantages and features of the present disclosure, and methods of achieving them will become apparent when the embodiments described below in detail are considered in conjunction with the accompanying drawings. However, the present disclosure is not limited to the embodiments disclosed below, but will be implemented in a variety of different forms, and the present embodiments are only provided so that the description of the present disclosure is complete, and to fully inform those of ordinary skill in the art to which the present disclosure belongs, of the scope of the disclosure, and the disclosure is only defined by the scope of the claims. Meanwhile, as used herein, the terms are for the purpose of describing the embodiments, and are not intended to limit the present disclosure. Herein, terms in the singular form also relate to the plural form unless specifically stated otherwise in the context. As used herein, the terms "comprises" and/or "comprising" specify the presence of stated components, steps, operations, and/or elements, but do not preclude the presence or addition of at least one other component, step, operation, and/or element.

Terms, such as "first", "second," and the like, can be used to describe various components, but the components should not be limited by the terms. Said terms are used in order only to distinguish one component from another component. For example, without departing from the right scope of the present disclosure, a first component may be termed as a second component, and similarly, a second component may be termed as a first component.

Further, when one component is referred to as being "connected to" or "coupled to" another component, it should be understood as that the one component may be directly connected or coupled to that other component, or any intervening component may also be present therebetween. Contrarily, when one component is referred to as being "directly connected" or "directly coupled" to another component, it should be understood as that no other component is present therebetween. Other expressions for describing the relationships between components, that is, expressions such as "between" and "directly between" or "neighboring to" and "directly neighboring to" should be interpreted in a similar manner.

When explaining the disclosure, if it is determined that a detailed description of a related known technology may unnecessarily obscure the subject matter of the present disclosure, the detailed description thereof will be omitted.

Hereinafter, embodiments of the present disclosure will be described in detail with reference to the accompanying drawings. In order to facilitate overall understanding in describing the present disclosure, the same reference numeral will be used for the same component regardless of the drawing numbers.

FIG. 1 shows a conceptual diagram of a method for changing a route when an error occurs in an autonomous driving artificial intelligence according to the present disclosure. FIG. 1 shows a conceptual diagram of a method for changing a route, which, when an error occurs in an autonomous driving artificial intelligence, is intended to minimize the occurrence frequency of the same error until the artificial intelligence is corrected through the retraining with respect to that error. When a specific artificial intelligence error occurs during autonomous driving along a set initial route A1, an autonomous driving system 100 of a vehicle transmits information about the error to a cloud server 200. The cloud server 200 analyzes the risk of an accident which that error would cause, and transmits the analysis result to the autonomous driving system 100 which uses that artificial intelligence. The autonomous driving system 100 determines whether to continue the autonomous driving based on the accident risk analysis result. When the autonomous driving is possible because the risk of accident is low despite the error, the autonomous driving system 100 resets to a route A2 having a low probability of occurrence of that error, and performs the autonomous driving along the route A2. When the risk of an accident is high due to the error, the autonomous driving system 100 moves the vehicle to a safe zone, and no longer allows the vehicle to perform the autonomous driving.

Figure 2:
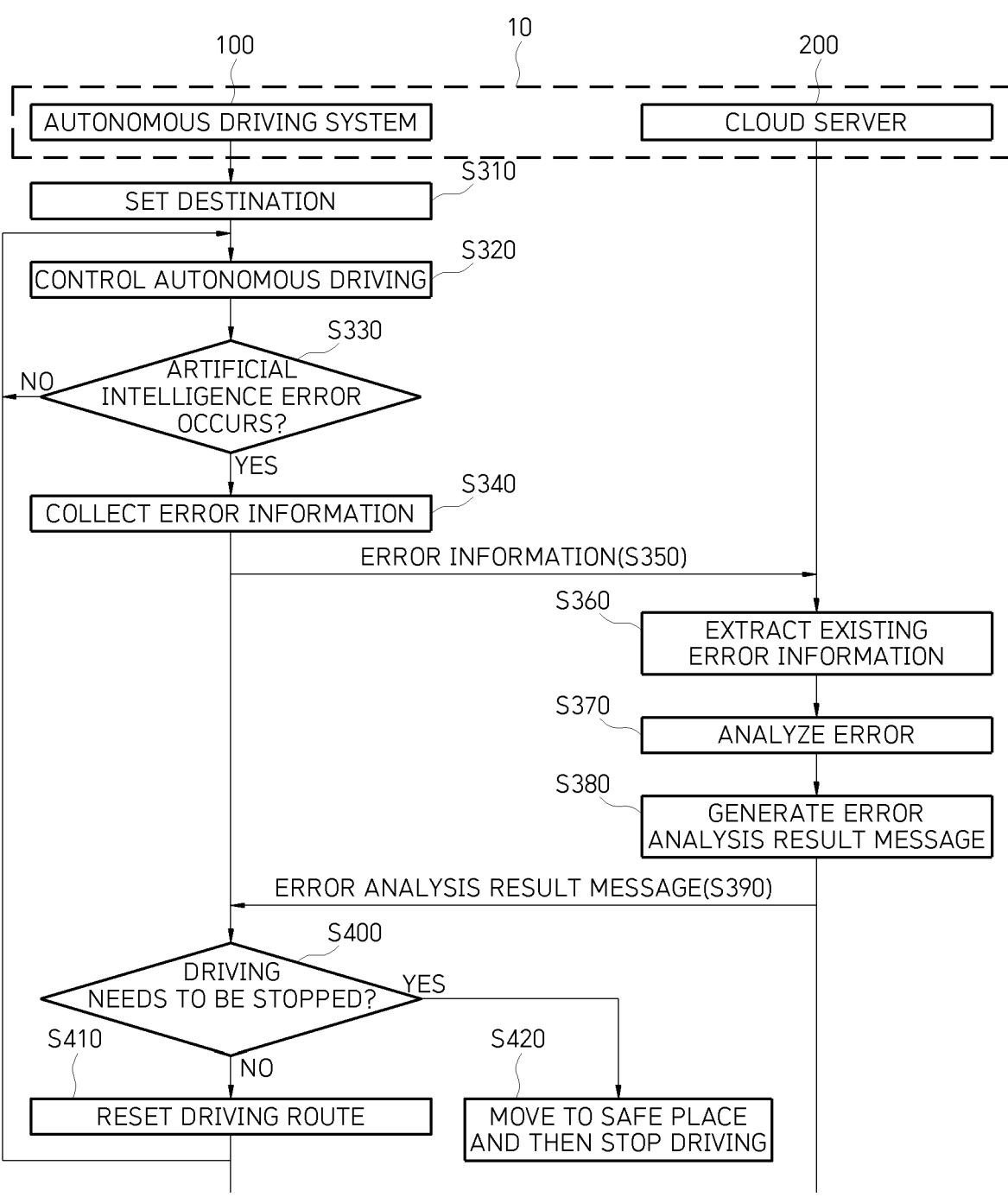
FIG. 2 shows a flowchart for explaining a method for changing a route when an error occurs in an autonomous driving artificial intelligence according to an embodiment of the present disclosure.

FIG. 2 shows a flowchart for explaining a method for changing a route when an error occurs in an autonomous driving artificial intelligence according to an embodiment of the present disclosure. The method for changing a route when an error occurs in an autonomous driving artificial intelligence according to an embodiment of the present disclosure is performed by a system for changing a route when an error occurs in an autonomous driving artificial intelligence 10 (hereinafter, briefly referred to as "route change system"). The route change system 10 includes the autonomous driving system 100 and the cloud server 200.

The method for changing a route when an error occurs in an autonomous driving artificial intelligence according to an embodiment of the present disclosure includes steps S310 to S420. It should be noted that the method for changing a route when an error occurs in an autonomous driving artificial intelligence shown in FIG. 2 is based on an embodiment, and the steps of the method for changing a route when an error occurs in an autonomous driving artificial intelligence according to the present disclosure are not limited to the embodiment shown in FIG. 2 but susceptible to addition, change or removal as needed.

The method for changing a route when an error occurs in an autonomous driving artificial intelligence according to an embodiment of the present disclosure may include a route change method of the autonomous driving system 100 when an error occurs in an autonomous driving artificial intelligence, and an autonomous driving artificial intelligence error information analysis and processing method of the cloud server 200. The route change method of the autonomous driving system 100 when an error occurs in an autonomous driving artificial intelligence includes steps S310 to S350 and steps S400 to S420. And, the autonomous driving artificial intelligence error information analysis and processing method of the cloud server 200 includes steps S360 to S390.

Step S310 is a step of setting a destination. The autonomous driving system 100 displays a destination setting screen, and sets the user's destination according to user input.

Step S320 is a step of controlling the autonomous driving. The autonomous driving system 100 sets a driving route according to the destination set by a user, and performs the autonomous driving control based on the set driving route.

Step S330 is a step of determining whether an artificial intelligence error occurs. Step S330 may be performed after step S320 or simultaneously with step S320.

The autonomous driving system 100 continuously monitors whether the artificial intelligence installed in the autonomous driving system 100 (hereinafter, referred to as "autonomous driving artificial intelligence") has accurately recognized an object. The autonomous driving system 100 determines whether the artificial intelligence has accurately recognized an object based on a comparison among recognition results of a plurality of sensors or on the accuracy of a result recognized by the autonomous driving artificial intelligence software itself. Additionally, the autonomous driving system 100 may determine, as an object recognition error of the artificial intelligence, even a case where an object detection software of a specific sensor could not recognize an object existing in the high-definition map DB 190. When detecting an error of the autonomous driving artificial intelligence, the autonomous driving system 100 proceeds to step S340, and otherwise, performs steps S320 and S330.

Step S340 is a step of collecting error information.

The autonomous driving system 100 collects error information of the autonomous driving artificial intelligence, which is the basis for the accident risk to be calculated by the cloud server 200. The error information of the autonomous driving artificial intelligence refers to various information relating to errors of the autonomous driving artificial intelligence, and will be briefly referred to as "error information". The error information includes the kind and version of the artificial intelligence in which the error occurred, and may further include any one or combinations of an error occurrence cause, a degree of the error, a time-to-collision (TTC) value with a neighboring vehicle at the time of the error occurrence, behavior attributes of a vehicle at the time of the error occurrence (e.g., speed, steering angle, whether the brake is operated), the surrounding environment at the time of error occurrence (number of neighboring vehicles or traffic volume), and an error occurrence place (road classification) and lane (road information). A specific information may be expressed by a predefined code. The autonomous driving system 100 may determine the error occurrence cause based on the contents analyzed in the process of determining whether the error has occurred in step S330. For example, when the artificial intelligence could not recognize a highway access road or lane existing in the high-definition map DB 190, the error occurrence cause may be determined to be 'unrecognition of the highway access road' or 'unrecognition of the right lane'. In addition, through the comparison among the recognition results of a plurality of sensors, when it is determined that a specific sensor could not recognize a front object, the error occurrence cause may be determined to be 'partial unrecognition of the front object'. The degree of error may be calculated based on the accuracy of an object recognition result of the artificial intelligence or on the reliability of an object detection result. In the present disclosure, the autonomous driving artificial intelligence can also be trained with regard to a probability value for the accuracy of an object recognition result. In this case, the artificial intelligence itself can output a confidence score for recognition accuracy. For example, the confidence score may be a value of a probability of how accurate class classification is for an inference result, an overlapping degree of a recognized object shape or the like. The degree of error may be calculated based on the confidence score. Meanwhile, when the confidence score is lower than a threshold value, a process of retraining the artificial intelligence by generating correct answer data again is required. For reference, the term 'traffic volume' refers to the number of vehicles passing through a specific point on the road during a certain period of time, and both the number and speeds of vehicles in a driving section are reflected in the traffic volume.

Step S350 is a step of transmitting the error information. The autonomous driving system 100 transmits the collected error information to the cloud server 200.

Step S360 is a step in which the cloud server 200 extracts previously stored error information.

The cloud server 200 receives error information transmitted by the autonomous driving system 100, and stores the received error information in an internal storage.

The cloud server 200 searches previously occurred error information of the same intelligence software kind and version from the storage. Specifically, the cloud server 200 extracts error information about previously occurred artificial intelligence errors (which may be referred to as 'existing error information' or 'past error information') from the internal storage based on the received error information. The cloud server 200 may extract existing error information from the internal storage based on the kind and version information of artificial intelligence in which an error has occurred, wherein the kind and version information is included in the error information received from the autonomous driving system 100. For example, the cloud server 200 extracts from existing error information stored in the internal storage the error information corresponding to the same kind and version of artificial intelligence as the kind and version of the artificial intelligence in which the error has occurred.

As described above, the kind and version information of the artificial intelligence in which the error has occurred is included in the received error information (error information transmitted by the autonomous driving system 100).

Step S370 is a step of analyzing an error.

The cloud server 200 analyzes an error based on the received error information and the error information extracted from the internal storage. The error analysis result includes an accident risk, error avoidance information, and behavior restriction information. That is, the cloud server 200 calculates the accident risk due to that artificial intelligence error and generates the error avoidance information and the behavior restriction information, based on the received error information and the extracted error information.

Table 1 is an illustration of information used by the cloud server 200 for the autonomous driving artificial intelligence error analysis. 'Information' in Table 1 represents error information and information derived or collected based on the error information (the number of error occurrences, the number of accidents, an accident type, and an accident risk), and respective configurations of the information are presented according to three cases (Case 1, Case 2, Case 3).

TABLE 1

| Information | Case 1 | Case 2 | Case 3 |
| --- | --- | --- | --- |
| Kind of artificial intelligence in which an error has occurred | 3D moving object detection | Driving environment recognition | 2D object recognition |
| Version of artificial intelligence in which an error has occurred | 1.56 | 1.0 | 2.05 |
| Error occurrence cause | 1 (front object partial unrecognition) | 23 (highway access road unrecognition) | 17 (Right lane unrecognition) |
| Degree of error | 1.5 | 5.7 | 3.0 |
| TTC | 6.3 | 7.5 | 1.2 |
| Vehicle behavior attribute — Speed | 64 km/h | 27 km/h | 38 km/h |
| Steering angle | 27 degrees | 57 degrees | 64 degrees |
| Brake | 0 | 1 | 0 |
| Surrounding environment at the time of error occurrence | 5 (many front vehicles) | 0 (no neighboring vehicle) | 5 (many front vehicles) |
| Error occurrence place (road classification) | 1 (city road) | 3 (highway access road) | 2 (intersection) |
| Lane | Third lane | Second lane | Fourth lane |
| Number of error | 1 | 3 | 1 |

TABLE 1-continued

| Information | Case 1 | Case 2 | Case 3 |
|---|---|---|---|
| occurrences | | | |
| Number of accidents | 0 | 1 | 0 |
| Accident type | — | 145 (access road collision) | — |
| Accident risk | 28 | 45 | 11 |

The cloud server 200 analyzes the received error information together with the existing error information relating to errors which have occurred in the same kind and version of artificial intelligence, and derives the number of times an error occurred (referred to as "number of error occurrences"), the number of times accidents occurred due to the error (referred to as "number of accidents"), and an accident type (If different accidents have occurred multiple times, it would be a type of a representative accident with high frequency), based on the kind and version of the artificial intelligence. The cloud server 200 may obtain the number of accidents or the accident type information from an external DB of an associated institution (e.g., Road Traffic Authority, or National Police Agency).

The cloud server 200 calculates the accident risk for a currently occurring artificial intelligence error based on the received error information and/or the error information about existing (past) errors which have occurred in the same kind and version of artificial intelligence. For example, the cloud server 200 calculates the accident risk for a currently occurring artificial intelligence error based on the degrees of errors about existing (past) errors which have occurred in the same kind and version of artificial intelligence, the number of error occurrences, the number of accidents caused by the errors, and the accident risks at the time of the error occurrences.

In an example, the cloud server 200 may calculate the accident risk by adding all of the value obtained by multiplying the degree of error by the weight w1 by the number of error occurrences, the value obtained by multiplying the number of accidents by the weight $w_2$, and the value obtained by multiplying the reciprocal ($TTC^{-1}$, reverse collision time) of the time-to-collision (TTC) by the weight $w_3$.

Here, the degree of error and TTC can use the average of values generated from the same kind and version of artificial intelligence. Meanwhile, the cloud server 200 may analyze the error information for the same kind and version of artificial intelligence among the existing error information, and may set the weight values $w_1$, $w_2$, $w_3$ in advance so that the accident risk becomes 50 or more in the case where the accident actually occurred and the accident risk becomes 50 or less in the case where the accident did not occur. In this case, if the threshold value of the accident risk is 50 and the calculated accident risk is 50 or more, in a step after step S380, the cloud server 200 may deliver a message to stop performing the autonomous driving (information on whether to perform the autonomous driving operation is indicative of 'operation interruption') to the autonomous driving system 100.

The cloud server 200 generates the error avoidance information based on the received error information and/or existing (past) error information. The cloud server 200 may generate the error avoidance information based on the existing error information about errors which have occurred in the same kind and version of artificial intelligence. The error avoidance information may include any one or combinations of the error occurrence cause, the error occurrence place, the lane, and surrounding environment information at the time of the error occurrence (the number of neighboring vehicles or traffic volume) among the error information generated in the same kind and version of artificial intelligence. In an example, the cloud server 200 may include only the error occurrence cause whose occurrence rate exceeds a certain critical rate or whose occurrence times exceeds a certain number, the error occurrence place, the lane, or surrounding environment information into the error avoidance information. In another example, the cloud server 200 may use, as the error avoidance information, a combination of informations with the highest frequency of the same kind and version of artificial intelligence. That is, the cloud server 200 may use, as the error avoidance information, a combination with the highest frequency among combinations of the error occurrence cause, the error occurrence place, the lane, and the surrounding environment information.

The cloud server 200 generates the error avoidance information based on the received error information and/or existing (past) error information. The cloud server 200 may generate the behavior restriction information based on vehicle behavior attribute information among the existing error information about errors which have occurred in the same kind and version of artificial intelligence. For example, the cloud server 200 generates the behavior restriction information by integrating the vehicle behavior attribute information (e.g., vehicle speed, steering angle, and whether the brake is operated or not) at the time of error occurrence.

Step S380 is a step of generating an error analysis result message. The cloud server 200 generates the error analysis result message based on the error analysis result.

The error analysis result message may include the error analysis result (at least one of the accident risk, the error avoidance information, and the behavior restriction information).

Additionally, the error analysis result message may include an autonomous driving operation availability information. The autonomous driving operation availability information indicates operation continuation or operation interruption.

For example, when the accident risk is greater than or equal to a predetermined threshold value, the cloud server 200 includes the autonomous driving operation availability information indicating 'operation interruption' into the error analysis result message, while when the accident risk is less than the predetermined threshold value, the cloud server 200 includes the autonomous driving operation availability information indicating 'operation continuation' into the error analysis result message.

The cloud server 200 may further include the error avoidance information and the behavior restriction information into the error analysis result message only when the accident risk is less than the predetermined threshold value. For example, when the accident risk is less than the certain threshold value, the cloud server 200 generates the error avoidance information based on the place where the vehicle was driven at the time of the error occurrence (error occurrence place), the surrounding environment (e.g., surrounding vehicles), the lane or the like, and generates the behavior restriction information based on the behavior information of the vehicle at the time of the error occurrence, so that the autonomous driving system 100 can generate a driving route which enables the avoidance of the artificial intelligence error.

Step S390 is a step of transmitting the error analysis result message. The cloud server 200 transmits the error analysis result message to the autonomous driving systems 100 of all autonomous driving vehicles using the same kind and version of artificial intelligence software as those of the artificial intelligence in which the error has occurred.

The error analysis result message may include the autonomous driving operation availability information. The autonomous driving operation availability information indicates operation continuation or operation interruption.

In addition, the error analysis result message may include any one or a combination of the accident risk, the error avoidance information, and the behavior restriction information.

Step S400 is a step in which the autonomous driving system 100 determines whether to stop the driving of the vehicle.

The autonomous driving system 100 receives the error analysis result message, and determines whether the vehicle needs to stop driving (whether to stop the driving of the vehicle) based on the error analysis result message.

In an example, the autonomous driving system 100 may determine whether to stop the driving of the vehicle depending on the autonomous driving operation availability information included in the error analysis result message. That is, the autonomous driving system 100 may determine that the autonomous driving operation can continue to be performed when the autonomous driving operation availability information of the error analysis result message indicates the operation continuation, and may determine that the autonomous driving operation needs to be stopped when it indicates the operation interruption.

In another example, when the error analysis result message includes the accident risk, the autonomous driving system 100 may determine whether or not to stop the driving of the vehicle depending on whether or not the accident risk is greater than or equal to a predetermined threshold value. That is, the autonomous driving system 100 determines that the driving of the vehicle needs to be stopped when the accident risk is greater than or equal to the predetermined threshold value. Additionally, when the accident risk is less than the predetermined threshold value, the autonomous driving system 100 may determine that it is not necessary to stop the driving of the vehicle (it is possible to continue the driving of the vehicle).

When determining that the driving of the vehicle needs to be stopped, the autonomous driving system 100 performs step S420, but otherwise it performs step S410.

Step S410 is a step of resetting the driving route of the vehicle.

When the autonomous driving system 100 determines that there is no need to stop the driving of the vehicle, it resets the route of the vehicle to a route which enables the reduction of the accident risk (S410), and it performs the autonomous driving control of the vehicle along the changed route (S320).

If the error analysis result message includes the error avoidance information and the behavior restriction information, the autonomous driving system 100 resets the path of the vehicle to a path which enables the reduction of the accident risk, based on the error avoidance information included in the error analysis result message. The autonomous driving system 100 may reset to the route which enables the avoidance of the error occurrence place and the surrounding environment (e.g., traffic volume), based on the error occurrence cause included in the error avoidance information. For example, if the place among the error occurrence places which has the highest frequency is '3 (expressway access road)' and the cause among the error occurrence causes which has the highest frequency is '23 (expressway access road unrecognition)', the autonomous driving system 100 may reset to a route which does not include the highway access road (S410).

And the autonomous driving system 100 performs the autonomous driving control of the vehicle based on the changed route and the behavior restriction information. For example, the behavior restriction information may include the vehicle speed, steering angle, and information about whether the brake is operated at the time of the occurrence of the artificial intelligence error, and in this case, the autonomous driving system 100 controls the vehicle to drive while minimizing the behavior attributes (movements) of the vehicle corresponding to the behavior restriction information (S320). Minimizing the behavior (movement) of the vehicle refers to avoiding the reduction of the speed or sudden braking or sudden turn to prevent an accident from occurring, in an environment where errors are highly likely to occur.

That is, the autonomous driving system 100 resets to a driving route which enables the avoidance of an error during the driving, and then restricts the movement of the vehicle based on the behavior restriction information.

Step S420 is a step of stopping the driving of the vehicle after moving it to a safe place.

In an example, when the autonomous driving system 100 determines that it is necessary to stop the driving of the vehicle, it moves the vehicle to a safe place through vehicle control and then stops the driving of the vehicle. And the autonomous driving system 100 notifies the user that the driving has been stopped.

In another example, when the autonomous driving is stopped, the autonomous driving system 100 may stop the autonomous driving, and hand over the control to the driver.

The above-described method for changing a route when an error occurs in an autonomous driving artificial intelligence has been described with reference to the flowchart presented in the drawing. For simplicity, the method is shown and described as a series of blocks, but the disclosure is not limited to the order of the blocks, and some blocks may also be performed in a different order from that shown and described herein or simultaneously with other blocks, and various other branches, flow paths, and sequences of blocks may be implemented that achieve the same or similar results. Also, not all blocks shown may be required for implementation of the methods described herein.

Meanwhile, in the description with reference to FIG. 2, each step may be further divided into additional steps or combined into fewer steps according to an embodiment of the present disclosure. Further, some steps may be omitted if necessary, and the order of steps may be changed. Additionally, the contents of FIG. 1 can be applied to the contents of FIG. 2 even though they have been omitted. Also, the contents of FIG. 2 may be applied to the contents of FIG. 1.

Figure 3:
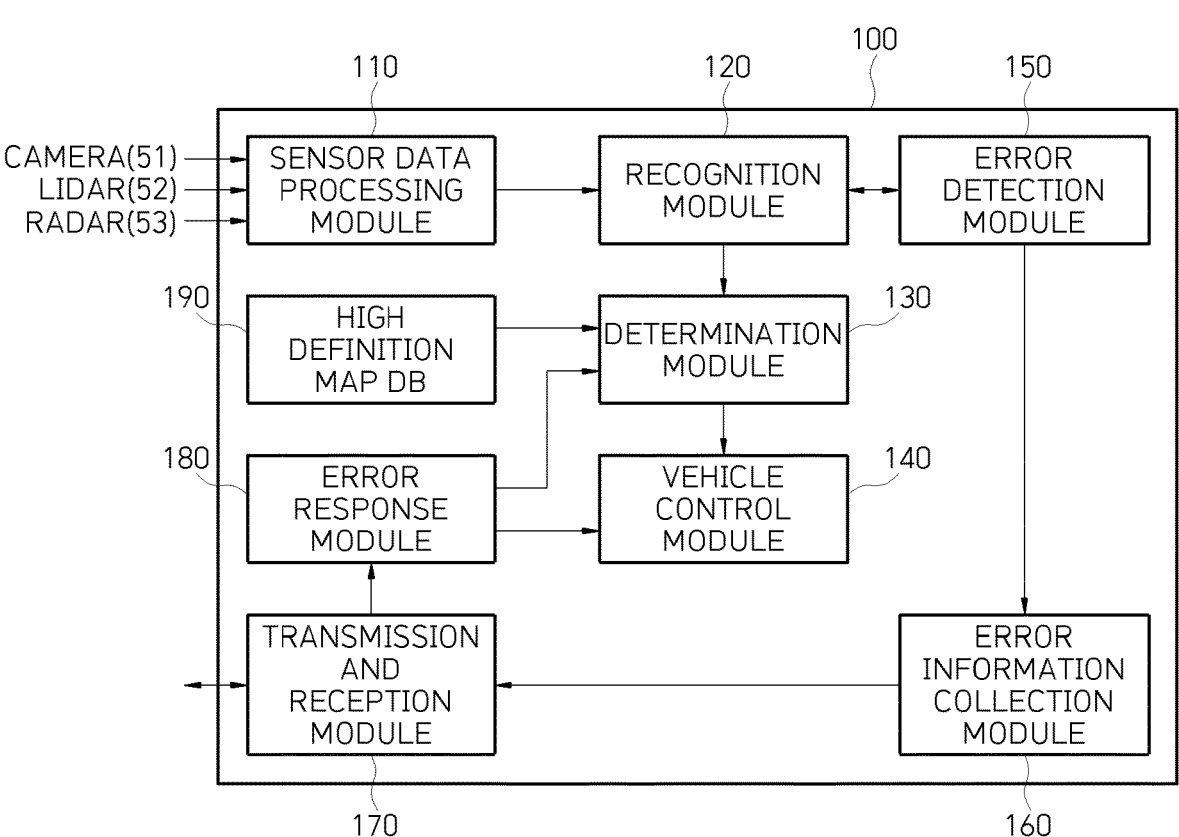
FIG. 3 shows a block diagram representing the configuration of an autonomous driving system according to an embodiment of the present disclosure.

FIG. 3 shows a block diagram representing the configuration of an autonomous driving system according to an embodiment of the present disclosure. When an error occurs in an autonomous driving artificial intelligence, the autonomous driving system 100 collects error information and transmits the same to the cloud server 200. And when receiving the error analysis result message from the cloud server 200, the autonomous driving system 100 resets the driving route based on the error analysis result message to continue the driving of the vehicle or stop the driving of the vehicle.

The autonomous driving system 100 may include a sensor data processing module 110, a recognition module 120, a determination module 130, a vehicle control module 140, an error detection module 150, an error information collection module 160, a transmission and reception module 170, and an error response module 180, and may further include a high-definition map DB 190.

The autonomous driving system 100 shown in FIG. 3 is according to an embodiment, and components of the autonomous driving system 100 according to the present disclosure are not limited to the embodiment shown in FIG. 3, but susceptible to addition, change or removal as needed.

The sensor data processing module 110 receives sensor data from a camera 51, a LIDAR 52, and a radar 53 installed or connected to the autonomous driving system 100, and delivers the received sensor data to the recognition module 120.

The recognition module 120 detects an object based on the sensor data, and determines the kind of the detected object using an artificial intelligence based on the sensor data with respect to the detected object. That is, the recognition module 120 may be configured with an artificial intelligence software which detects an object and determines the kind of the object. The recognition module 120 generates object information, which is an artificial intelligence recognition result, based on the object detection information and the object kind information. The recognition module 120 delivers the object information to the determination module 130.

The determination module 130 sets a driving route according to the destination set by the user. Also, the determination module 130 may generate a driving route and behavior information (e.g., speed and steering angle) of the autonomous driving vehicle based on the object information. The determination module 130 delivers the driving route and the behavior information to the vehicle control module 140.

The vehicle control module 140 controls the movement of the vehicle based on the driving route and the behavior information.

The error detection module 150 monitors the recognition result (object information) of the artificial intelligence of the recognition module 120, and determines whether an artificial intelligence error exists. For example, the error detection module 150 may determine whether there is an error in the artificial intelligence installed in the recognition module 120 based on the object information generated by the recognition module 120. The error detection module 150 determines whether the artificial intelligence has accurately recognized an object based on a comparison among recognition results of a plurality of sensors or on the accuracy of a result recognized by the autonomous driving artificial intelligence software itself. Additionally, the error detection module 150 may determine, as an object recognition error of the artificial intelligence, even a case where an object detection software of a specific sensor could not recognize an object existing in the high-definition map DB 190.

When the error detection module 150 determines that an error of the artificial intelligence installed in the recognition module 120 has occurred, the error information collection module 160 collects various information relating to that error, that is, error information. The error information collection module 160 delivers the error information to the transmission and reception module 170.

The error information includes the kind and version of the artificial intelligence in which the error has occurred, and may further include any one or combinations of an error occurrence cause, a degree of the error, a time-to-collision (TTC) value with a neighboring vehicle at the time of the error occurrence, behavior attributes of a vehicle at the time of the error occurrence (e.g., speed, steering angle, whether the brake is operated), the surrounding environment at the time of error occurrence (number of neighboring vehicles or traffic volume), and an error occurrence place (road classification) and lane information (road information). A specific information may be expressed by a predefined code. The error information collection module 160 may obtain the error occurrence place or the lane information (road information) from the high-definition map DB 190. The error detection module 150 may calculate the degree of error based on the accuracy of the artificial intelligence object recognition result or the reliability of the object detection result.

In addition, the error detection module 150 may determine the error occurrence cause based on the contents analyzed in the process of determining whether the error has occurred. For example, when the artificial intelligence could not recognize a highway access road or lane existing in the high-definition map DB 190, the error detection module 150 may determine, as the error occurrence cause, 'unrecognition of the highway access road' or 'unrecognition of the right lane'. In addition, through the comparison among the recognition results of a plurality of sensors, when it is determined that a specific sensor has not recognized a front object, the error detection module 150 may determine 'partial unrecognition of the front object' as the error occurrence cause.

The transmission and reception module 170 delivers error information to the cloud server 200, and receives an error analysis result message from the cloud server 200 as a reply (response) thereto.

The error analysis result message may include the autonomous driving operation availability information. The autonomous driving operation availability information indicates operation continuation or operation interruption. In addition, the error analysis result message may include any one or a combination of the accident risk, the error avoidance information, and the behavior restriction information.

The transmission and reception module 170 delivers the error analysis result message or information included in the error analysis result message to the error response module 180.

The error response module 180 responds to the error through the determination module 130 and the vehicle control module 140 based on the error analysis result message.

For example, the error response module 180 may determine whether to stop the driving of the vehicle depending on the autonomous driving operation availability information included in the error analysis result message. That is, the autonomous driving system 100 may determine that the autonomous driving operation can continue to be performed when the autonomous driving operation availability information of the error analysis result message indicates the operation continuation, and may determine that the autonomous driving operation needs to be stopped when it indicates the operation interruption.

In another example, when the error analysis result message includes the accident risk, the error response module 180 may determine whether or not to stop the driving of the vehicle depending on whether the accident risk is greater than or equal to a predetermined threshold value. That is, the error response module 180 determines that the driving of the vehicle needs to be stopped when the accident risk is greater than or equal to the predetermined threshold value. In this case, the error response module 180 may move the vehicle to a safe place through the determination module 130 and the vehicle control module 140, and then prevent the vehicle from performing the autonomous driving.

Additionally, when the accident risk is less than the predetermined threshold value, the error response module 180 may determine that it is not necessary to stop the driving of the vehicle (it is possible to continue the driving of the vehicle). In this case, the error response module 180 delivers the error avoidance information to the determination module 130, and the determination module 130 resets the driving route of the autonomous driving vehicle, so that the vehicle drives on a route which does not correspond to the error occurrence place and the traffic volume included in the error avoidance information or which has the error occurrence places or the traffic volume lower than the predetermined threshold value. In addition, the error response module 180 delivers the behavior restriction information to the vehicle control module 140, and the vehicle control module 140 controls the autonomous driving vehicle not to drive along a movement corresponding to the behavior information of the vehicle based on vehicle behavior information (e.g., vehicle speed, steering angle, whether the brake is operated) at the time of error occurrence.

Meanwhile, the contents of FIGS. 1 and 2 may be applied to the contents of FIG. 3 even though they are omitted in the description with reference to FIG. 3. Also, the contents of FIG. 3 may be applied to the contents of FIGS. 1 and 2.

Figure 4:
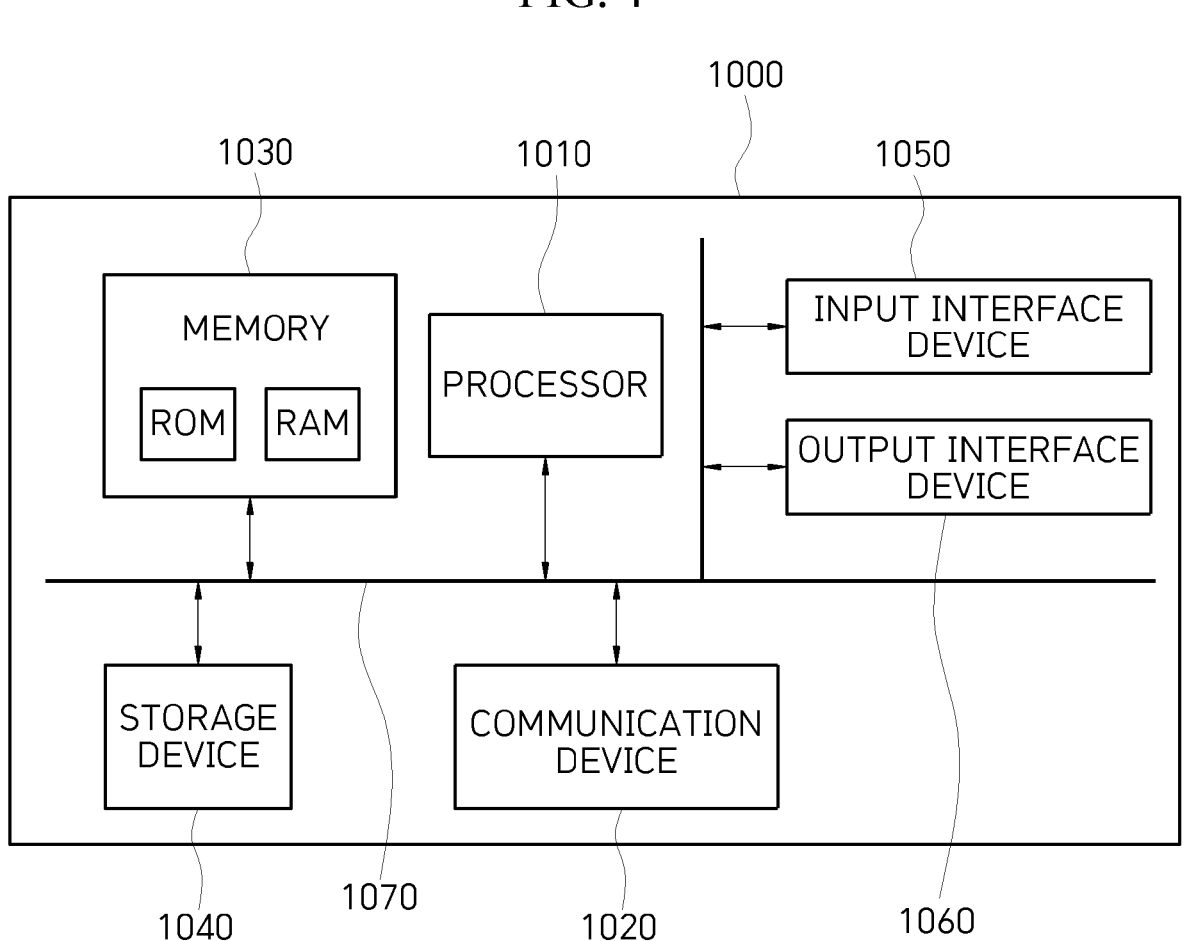
FIG. 4 shows a block diagram representing a computer system for implementing a method according to an embodiment of the present disclosure.

FIG. 4 shows a block diagram representing a computer system for implementing a method for changing a route when an error occurs in an autonomous driving artificial intelligence according to an embodiment of the present disclosure. The autonomous driving system 100 or the cloud server 200 may be implemented in the form shown in FIG. 4.

Referring to FIG. 4, a computer system 1000 may include at least one of a processor 1010, a memory 1030, an input interface device 1050, an output interface device 1060, and a storage device 1040 which communicate to each other through a bus 1070. The computer system 1000 may further include a communication device 1020 coupled to a network. The processor 1010 may be a central processing unit (CPU) or a semiconductor device that executes instructions stored in the memory 1030 or the storage device 1040. The memory 1030 and the storage device 1040 may include various types of volatile or non-volatile storage media. For example, the memory may include a read only memory (ROM) and a random access memory (RAM). In an embodiment of the present description, the memory may be located inside or outside the processor, and the memory may be connected to the processor through various known means. The memory may be volatile or non-volatile storage media in various forms, and may include, for example, a read-only memory (ROM) or a random access memory (RAM).

Accordingly, an embodiment of the present disclosure may be implemented as a computer-implemented method or as a non-transitory computer-readable medium in which computer-executable instructions are stored. In an example, when being executed by the processor, the computer-readable instructions may perform a method according to at least one aspect of the present disclosure.

The communication device 1020 may transmit or receive a wired signal or a wireless signal.

Additionally, the method according to an embodiment of the present disclosure may be implemented in the form of program instructions that can be executed by various computer means, and may be recorded on a computer readable medium.

The computer readable medium may include, alone or in combination, program instructions, data files, data structures, or the like. Program instructions recorded on the computer readable medium may be specially designed and configured for an embodiment of the present disclosure, or may be known and available to those skilled in the art of the field of computer software. The computer-readable recording medium may include a hardware device configured to store and execute program instructions. For example, the computer-readable recording medium may include a magnetic medium such as a hard disk, a floppy disk and a magnetic tape, an optical medium such as a CD-ROM and a DVD, a magneto-optical medium such as a floptical disk, a ROM, a RAM, a flash memory, or the like. The program instructions may include high-level language codes that can be executed by a computer through an interpreter or the like, as well as machine language codes generated by a compiler.

For reference, components according to an embodiment of the present disclosure may be implemented in a software form or in a hardware form such as a digital signal processor (DSP), a field programmable gate array (FPGA), or an application specific integrated circuit (ASIC), and may perform predetermined roles.

However, the term 'components' are not meant to be limited to software or hardware, and each component may also be configured to be in an addressable storage medium or configured to reproduce one or more processors.

Thus, examples of the component include components such as software components, object-oriented software components, class components, and task components, processes, functions, properties, procedures, sub-routines, segments of program code, drivers, firmware, microcodes, circuits, data, databases, data structures, tables, arrays and variables.

Components and the functions provided within those components may be combined into a smaller number of components or further divided into additional components.

Meanwhile, it will be understood that each block of the flowchart drawings and combinations of the flowchart drawings can be performed by computer program instructions. Since these computer program instructions may be loaded into a processor of a general-purpose computer, special-purpose computer, or other programmable data processing equipment, the instructions executed by the processor of the computer or other programmable data processing equipment will constitute a means for performing the functions described in the flowchart block(s). Since the computer program instructions can also be loaded on a computer or other programmable data processing equipment, a series of operational steps may be performed on the computer or other programmable data processing equipment to generate a computer-executed process, so that instructions executed by the computer or other programmable data processing equipment can also provide steps for carrying out the functions described in the flowchart block(s).

Additionally, each block may represent a module, segment or portion of code that includes one or more executable instructions for executing specified logical function(s). It should also be noted that in some alternative embodiments, the functions mentioned in the blocks may occur out of the order. For example, in practice, two blocks shown in succession may be executed substantially at the same time, or the blocks may sometimes be executed in a reverse order depending on their functions.

The term '~module' used in this embodiment means software or a hardware component such as FPGA or ASIC, and '~module' performs certain roles. However, the term '~module' is not limited to software or hardware. The term '~module' may also be configured to be in an addressable storage medium or configured to reproduce one or more processors. Thus, examples of the term '~module' include components such as software components, object-oriented software components, class components, and task components, processes, functions, properties, procedures, subroutines, segments of program code, drivers, firmware, microcodes, circuits, data, databases, data structures, tables, arrays and variables. Components and the functions provided within modules' may be combined into a smaller number of components and '~modules' or further divided into additional components and '~modules'. Additionally, components and '~modules' may also be implemented to playback one or more CPUs in a device or a secure multimedia card.

Although the detailed description has been made above with reference to preferred embodiments of the present disclosure, a person skilled in the art will understand that various modifications and changes can be made to the present disclosure without departing from the technical idea and scope of the disclosure as disclosed in the claims below.

LIST OF REFERENCE SIGNS

51: Camera
52: LIDAR
53: Radar
100: Autonomous driving system
110: Sensor data processing module
120: Recognition module
130: Determination module
140: Vehicle control module
150: Error detection module
160: Error information collection module
170: Transmission and reception module
180: Error respone module
190: High-definition map DB
200: Cloud server
1000: Computer system
1010: Processor
1020: Communication device
1030: Memory
1040: Storage device
1050: Input interface device
1060: Output interface device
1070: Bus

What is claimed is:

1. A method for changing a route of an autonomous driving vehicle when an error occurs in an autonomous driving artificial intelligence, the method comprising:

determining whether an error has occurred in an autonomous driving artificial intelligence;

collecting error information of the artificial intelligence when the error of the artificial intelligence has occurred;

extracting, from a storage, past error information about a same kind and version of another artificial intelligence as a kind and version of the artificial intelligence based on the error information of the artificial intelligence;

generating an error analysis result based on the past error information;

generating an error analysis result message based on the error analysis result;

determining whether driving of the autonomous driving vehicle needs to be stopped based on the error analysis result message; and moving the autonomous driving vehicle to a safe place and stopping the driving of the autonomous driving vehicle when it is determined that the driving of the autonomous driving vehicle needs to be stopped, wherein the determining whether an error has occurred in the autonomous driving artificial intelligence includes determining whether the artificial intelligence has accurately recognized an object based on a comparison among recognition results of a plurality of sensors, wherein the past error information includes degree of error, number of error occurrences, number of accidents, and a vehicle accident risk caused by errors of the same kind and version of the other artificial intelligence as the kind and version of the artificial intelligence in which the error has occurred, wherein the error analysis result includes a vehicle accident risk caused by the error of the artificial intelligence, wherein the error analysis result includes error avoidance information, wherein the generating of the error analysis result message includes including an autonomous driving operation availability information indicating 'operation continuation' and the error avoidance information into the error analysis result message when the vehicle accident risk caused by the error of the artificial intelligence is less than a first predetermined threshold value, wherein the method further comprises resetting a driving route of the autonomous driving vehicle based on the error avoidance information when it is determined that it is not necessary to stop the driving of the autonomous driving vehicle, wherein the generating of the error analysis result includes generating the error avoidance information based on the past error information, wherein the error avoidance information includes an error occurrence cause and an error occurrence place at a time of error occurrence in the past error information, and wherein the resetting includes resetting the driving route so as not to include an error occurrence place associated with an error occurrence cause having a frequency that is above a second predetermined threshold value.

2. The method for changing a route of an autonomous driving vehicle when an error occurs in an autonomous driving artificial intelligence according to claim 1, wherein the extracting of the past error information from the storage includes extracting, from the storage, the past error information about the same kind and version of the other artificial intelligence as the kind and version of the artificial intelligence in which the error has occurred.

3. The method for changing a route of an autonomous driving vehicle when an error occurs in an autonomous driving artificial intelligence according to claim 1, wherein the error analysis result includes the vehicle accident risk caused by the error of the artificial intelligence, and wherein the generating of the error analysis result message includes including an autonomous driving operation availability information indicating 'operation interruption' into the error analysis result message when the vehicle accident risk caused by the error of the artificial intelligence is greater than or equal to the first predetermined threshold value.

4. The method for changing a route of an autonomous driving vehicle when an error occurs in an autonomous driving artificial intelligence according to claim 3, wherein the determining of whether the driving of the autonomous driving vehicle needs to be stopped includes determining that the driving of the autonomous driving vehicle needs to be stopped when the error analysis result message includes the autonomous driving operation availability information indicating 'operation interruption'.

5. The method for changing a route of an autonomous driving vehicle when an error occurs in an autonomous driving artificial intelligence according to claim 1, wherein the error analysis result message includes the vehicle accident risk caused by the error of the artificial intelligence, and wherein the determining of whether the driving of the autonomous driving vehicle needs to be stopped includes determining that the driving of the autonomous driving vehicle needs to be stopped when the vehicle accident risk caused by the error of the artificial intelligence is greater than or equal to the first predetermined threshold value.

6. The method for changing a route of an autonomous driving vehicle when an error occurs in an autonomous driving artificial intelligence according to claim 1, wherein the determining of whether the driving of the autonomous driving vehicle needs to be stopped includes determining that it is not necessary to stop the driving of the autonomous driving vehicle when the error analysis result message includes the autonomous driving operation availability information indicating 'operation continuation'.

7. The method for changing a route of an autonomous driving vehicle when an error occurs in an autonomous driving artificial intelligence according to claim 1, further comprising resetting the driving route of the autonomous driving vehicle when it is determined that it is not necessary to stop the driving of the autonomous driving vehicle.

8. A method for changing a route in an autonomous driving system installed on an autonomous driving vehicle when an error occurs in an autonomous driving artificial intelligence, the method comprising:

determining whether an error has occurred in an autonomous driving artificial intelligence;

collecting error information of the artificial intelligence when the error of the artificial intelligence has occurred;

transmitting the error information of the artificial intelligence to a cloud server;

receiving an error analysis result message corresponding to the error information of the artificial intelligence from the cloud server;

determining whether driving of the autonomous driving vehicle needs to be stopped based on the error analysis result message;

moving the autonomous driving vehicle to a safe place and stopping the driving of the autonomous driving vehicle when it is determined that the driving of the autonomous driving vehicle needs to be stopped; and resetting a driving route of the autonomous driving vehicle when it is not necessary to stop the driving of the autonomous driving vehicle, wherein the determining whether an error has occurred in the autonomous driving artificial intelligence includes determining whether the artificial intelligence has accurately recognized an object based on a comparison among recognition results of a plurality of sensors, wherein the resetting includes resetting the driving route of the autonomous driving vehicle based on error avoidance information included in the error analysis result message, wherein the error avoidance information includes an error occurrence cause and an error occurrence place at a time of error occurrence in past error information generated in a same kind and version of another artificial intelligence as a kind and version of the artificial intelligence, and wherein the resetting includes resetting the driving route so as not to include an error occurrence place associated with an error occurrence cause having a frequency that is above a first predetermined threshold.

9. The method for changing a route in an autonomous driving system installed on an autonomous driving vehicle when an error occurs in an autonomous driving artificial intelligence according to claim 8, wherein the determining of whether the driving of the autonomous driving vehicle needs to be stopped includes determining that the driving of the autonomous driving vehicle needs to be stopped when a vehicle accident risk included in the error analysis result message is greater than or equal to a second predetermined threshold value.

10. The method for changing a route in an autonomous driving system installed on an autonomous driving vehicle when an error occurs in an autonomous driving artificial intelligence according to claim 8, wherein the determining of whether the driving of the autonomous driving vehicle needs to be stopped includes determining that the driving of the autonomous driving vehicle needs to be stopped when the error analysis result message includes the autonomous driving operation availability information indicating 'operation interruption'.

11. An autonomous driving system installed on an autonomous driving vehicle, the system comprising a processor and memory configured to implement:

a recognition module configured to detect an object based on sensor data, determine a kind of the object using an artificial intelligence with respect to the detected object, and generate object information;

an error detection module configured to determine whether an error has occurred in the artificial intelligence based on the object information;

an error information collection module configured to collect error information of the artificial intelligence when the error of the artificial intelligence has occurred;

a transmission and reception module configured to transmit the error information to a cloud server, and receive an error analysis result message corresponding to the error information from the cloud server;

an error response module configured to respond to the error of the artificial intelligence based on the error analysis result message;

a vehicle control module configured to move the autonomous driving vehicle to a safe place and stop the driving of the autonomous driving vehicle when it is determined that the driving of the autonomous driving vehicle needs to be stopped; and a determination module configured to set a driving route of the autonomous driving vehicle, wherein the error detection module is configured to determine the artificial intelligence has accurately recognized an object based on a comparison among recognition results of a plurality of sensors, wherein the error response module delivers error avoidance information included in the error analysis result message to the determination module when a vehicle accident risk is included in the error analysis result message and the vehicle accident risk is less than a first predetermined threshold value, wherein the error avoidance information includes an error occurrence cause and an error occurrence place at a time of error occurrence in past error information generated in a same kind and version of another artificial intelligence as a kind and version of the artificial intelligence, wherein the determination module resets the driving route of the autonomous driving vehicle based on the error avoidance information so as not to include an error occurrence place associated with an error occurrence cause having a frequency that is above a second predetermined threshold value.

12. The autonomous driving system installed on an autonomous driving vehicle according to claim 11, wherein the error response module checks whether the error analysis result message includes autonomous driving operation availability information indicating 'operation interruption', and determines that it is necessary to stop the driving of the vehicle when the autonomous driving operation availability information indicating 'operation interruption' is included in the error analysis result message.

13. The autonomous driving system installed on an autonomous driving vehicle according to claim 11, wherein the error response module determines that it is necessary to stop the driving of the vehicle when the error analysis result message includes a vehicle accident risk and the vehicle accident risk is greater than or equal to the first predetermined threshold value.

* * * * *